US011079798B1

(12) United States Patent
Manzano et al.

(10) Patent No.: US 11,079,798 B1
(45) Date of Patent: Aug. 3, 2021

(54) CASE FOR PORTABLE ELECTRONIC COMPUTING DEVICE

(71) Applicant: Pioneer Square Brands, Inc., Seattle, WA (US)

(72) Inventors: Megan Elizabeth Zumel Manzano, Seattle, WA (US); Michael Cooper Ferren, Camas, WA (US); Brian Lewis Piper, Seattle, WA (US)

(73) Assignee: PIONEER SQUARE BRANDS, INC., McLean, VA (US)

( * ) Notice: Subject to any disclaimer, the term of this patent is extended or adjusted under 35 U.S.C. 154(b) by 0 days.

(21) Appl. No.: 17/128,823

(22) Filed: Dec. 21, 2020

(51) Int. Cl.
*G06F 1/16* (2006.01)

(52) U.S. Cl.
CPC .......... *G06F 1/1628* (2013.01); *G06F 1/1656* (2013.01); *G06F 1/1616* (2013.01)

(58) Field of Classification Search
CPC .... G06F 1/1628; G06F 1/1616; G06F 1/1654; G06F 1/1656; G06F 1/1669
See application file for complete search history.

(56) References Cited

U.S. PATENT DOCUMENTS

| | | | | |
|---|---|---|---|---|
| 6,036,155 | A * | 3/2000 | Tsui | E02B 3/26 248/345.1 |
| 8,509,865 | B1 * | 8/2013 | LaColla | H04B 1/3888 455/575.8 |
| 2008/0308437 | A1 * | 12/2008 | Lin | G06F 1/1616 206/320 |
| 2015/0097009 | A1 * | 4/2015 | Burgess | H04B 1/3888 224/191 |
| 2020/0019214 | A1 * | 1/2020 | Mangum | G06F 1/1626 |

* cited by examiner

*Primary Examiner* — Nidhi Thaker
(74) *Attorney, Agent, or Firm* — Grandview Law

(57) ABSTRACT

Systems and methods are involved with but are not limited to an apparatus including a laptop case assembly for a laptop, the laptop case assembly includes a display case portion including a base portion, and at least one pad portion, the at least one pad portion being contiguously adjacent to at least one surface portion of the base portion, the at least one pad portion including a plurality of ridges and a plurality of grooves, a keyboard case portion including a base portion, and at least one pad portion, the at least one pad portion being contiguously adjacent to the at least one surface portion of the base portion, and the at least one pad portion including a plurality of ridges and a plurality of grooves. In addition, other aspects are described in the claims, drawings, and text forming a part of the present disclosure.

19 Claims, 13 Drawing Sheets

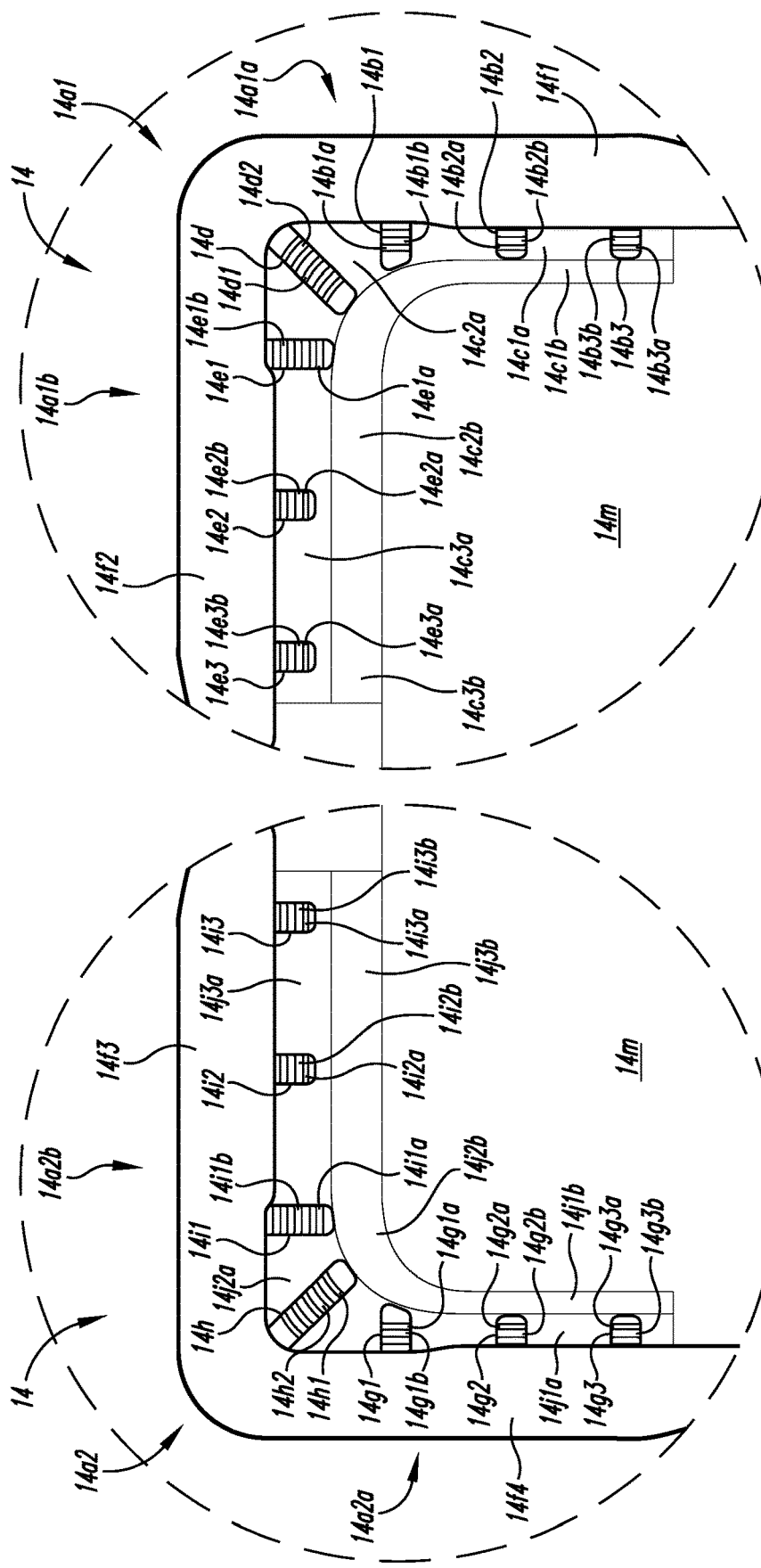

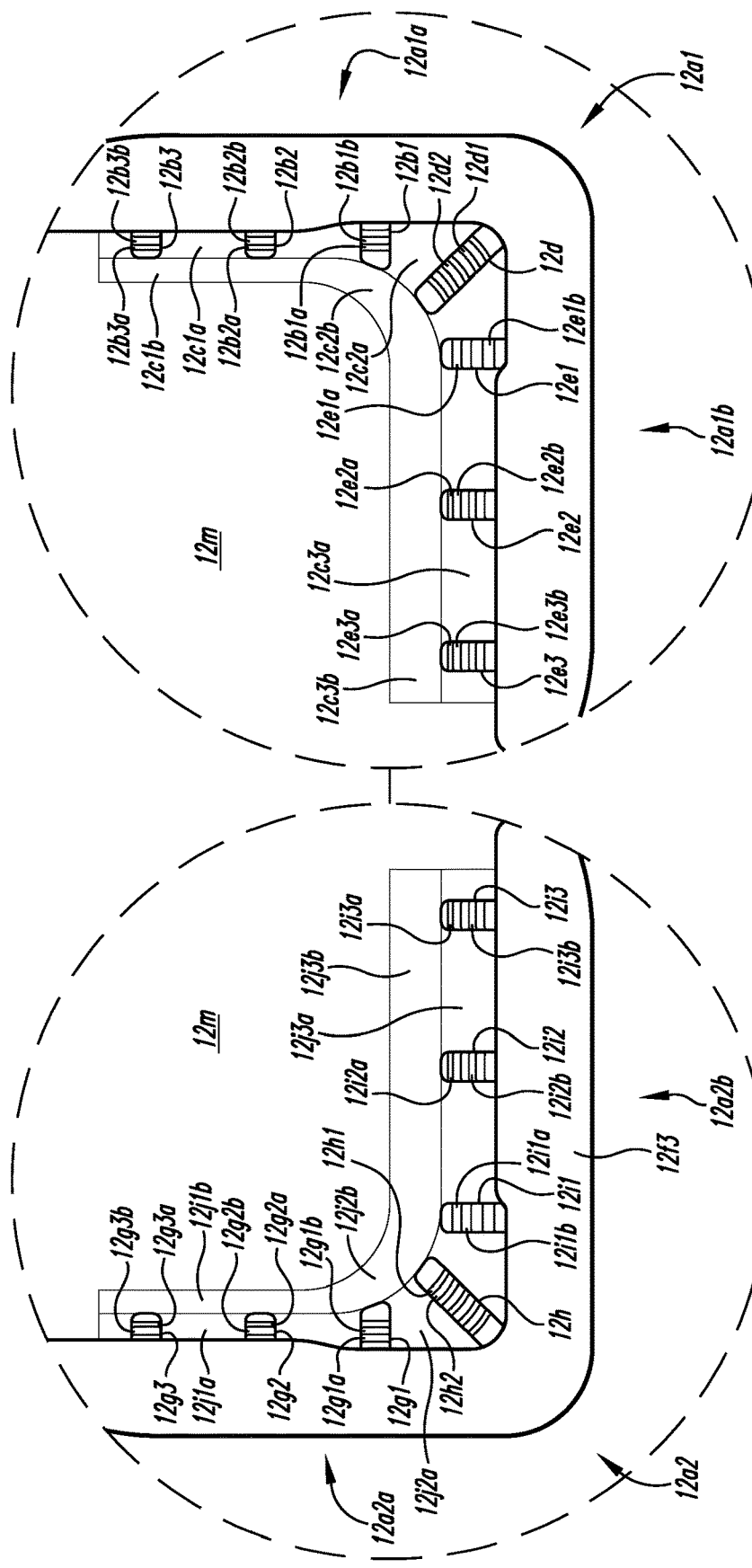

CASE FOR PORTABLE ELECTRONIC COMPUTING DEVICE

SUMMARY

In one or more aspects, an apparatus can include, but is not limited to a laptop case assembly for a laptop, the laptop including a laptop display and a laptop keyboard, the laptop case assembly including (I) a display case portion can include a first side, a second side, a third side, a fourth side, a base portion, and at least one pad portion, (A) the base portion can include at least one surface portion, (B) the base portion can be circumferentially bound by the first side, the second side, the third side, and the fourth side, (C) the at least one pad portion can be contiguously adjacent to the at least one surface portion of the base portion, (D) the at least one pad portion can include a plurality of ridges and a plurality of grooves, (i) at least one of the plurality of ridges can be contiguously adjacent to at least one of the plurality of grooves; and (II) a keyboard case portion can include a first side, a second side, a third side, a fourth side, a base portion, and at least one pad portion, (A) the base portion can include at least one surface portion, (B) the base portion can be circumferentially bound by the first side, the second side, the third side, and the fourth side, (C) the at least one pad portion can be contiguously adjacent to the at least one surface portion of the base portion, (D) the at least one pad portion can include a plurality of ridges and a plurality of grooves, (i) at least one of the plurality of ridges can be contiguously adjacent to at least one of the plurality of grooves. The at least one pad portion of the display case portion can be proximate to the first side of the at least one display case portion, and wherein the at least one pad portion of the keyboard case portion can be proximate to the first side of the at least one keyboard case portion. A first plurality of the at least one pad portion of the display case portion can be proximate to the first side of the at least one display case portion, a second plurality of the at least one pad portion of the display case portion can be proximate to the second side of the at least one display case portion, and wherein a first plurality of the at least one pad portion of the keyboard case portion can be proximate to the first side of the at least one keyboard case portion, a second plurality of the at least one pad portion of the display case portion can be proximate to the second side of the at least one display case portion. The first side and the second side of the display case portion can demarcate a first corner area, at least one of the at least one pad portion can be positioned in the first corner area of the display case portion, and wherein the first side and the second side of the at least one keyboard case portion can demarcate a first corner area, at least one of the at least one pad portion can be positioned in the first corner area of the keyboard case portion. The base portion of the display case portion can include at least one depressed portion proximate to the at least one pad portion and the base portion of the keyboard case portion can include at least one depressed portion proximate to the at least one pad portion. The base portion of the display case portion can include at least one angled portion, the at least one pad portion can be contiguously adjacent to at least one surface portion of the at least one angled portion, and the base portion of the keyboard case portion can include at least one angled portion, the at least one pad portion can be contiguously adjacent to at least one surface portion of the at least one angled portion. The at least one pad portion of the display case portion can include an elongated longitudinal dimension extending perpendicularly from the first side of the at least one display case portion, and wherein the at least one pad portion of the keyboard case portion can include an elongated longitudinal dimension extending perpendicularly from the first side of the at least one keyboard case portion. The at least one pad portion of the display case portion can include a silicone material and wherein the at least one pad portion of the display case portion can include a silicone material. The at least one pad portion of the display case portion can include a polyurethane material and wherein the at least one pad portion of the keyboard case portion can include a polyurethane material. The at least one pad portion of the display case portion can include an elastomeric material and wherein the at least one pad portion of the display case portion can include an elastomeric material. The base portion and the at least one pad portion of the display case portion can be co-molded together and the base portion and the at least one pad portion of the keyboard case portion can be co-molded together. The base portion and the at least one pad portion of the display case portion can be adhesively affixed together and the base portion and the at least one pad portion of the keyboard case portion can be adhesively affixed together. The first side of the at least one display case portion can include a wall portion, a portion of the at least one pad portion of the display case portion can be contiguously adjacent to the wall portion of the first side of the at least one display case portion, and the first side of the at least one keyboard case portion can include a wall portion, a portion of the at least one pad portion of the keyboard case portion can be contiguously adjacent to the wall portion of the first side of the at least one keyboard case portion. wherein the first side of the at least one display case portion includes a first shelf portion extending over the base portion of the display case portion, and the first side of the at least one keyboard case portion can include a first shelf portion extending over the base portion of the keyboard case portion. The fourth side of the at least one display case portion can include at least one tab stop, and the fourth side of the at least one keyboard case portion can include at least one tab stop.

In one or more aspects an apparatus can include, but is not limited to a case assembly for a portable electronic computing device, the portable electronic computing device including a display, the case assembly can include (I) a display case portion which can include a first side, a second side, a third side, a fourth side, a base portion, and at least one pad portion, (A) the base portion can include at least one surface portion, (B) the base portion can be circumferentially bound by the first side, the second side, the third side, and the fourth side, (C) the at least one pad portion can be contiguously adjacent to the at least one surface portion of the base portion, (D) the at least one pad portion including a plurality of ridges and a plurality of grooves, (i) at least one of the plurality of ridges being contiguously adjacent to at least one of the plurality of grooves. The at least one pad portion of the display case portion can be proximate to the first side of the at least one display case portion. A first plurality of the at least one pad portion of the display case portion can be proximate to the first side of the at least one display case portion, and a second plurality of the at least one pad portion of the display case portion can be proximate to the second side of the at least one display case portion.

In one or more aspects an apparatus can include, but is not limited to a case assembly for a portable electronic computing device, the portable electronic computing device including a keyboard, the case assembly can include (I) a keyboard case portion which can include a first side, a second side, a third side, a fourth side, a base portion, and at least one pad portion, (A) the base portion can include at least one surface portion, (B) the base portion can be circumferentially bound by the first side, the second side, the third side, and the fourth side, (C) the at least one pad portion can be contiguously adjacent to the at least one surface portion of the base portion, (D) the at least one pad portion can include a plurality of ridges and a plurality of grooves, (i) at least one of the plurality of ridges can be contiguously adjacent to at least one of the plurality of grooves. The first side and the second side of the at least one keyboard case portion can demarcate a first corner area, at least one of the at least one pad portion positioned in the first corner area of the keyboard case portion.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of an accessory coupling system articles of manufacture, compositions of matter, systems for producing and/or methods for producing same that may provide context, for instance, in introducing one or more processes and/or devices described herein.

FIG. 3 is an enlarged top plan view of the dashed-circle portion labeled "3" of the laptop case assembly shown in FIG. 2.

FIG. 4 is an enlarged top plan view of the dashed-circle portion labeled "4" of the laptop case assembly shown in FIG. 2.

FIG. 5 is an enlarged top plan view of the dashed-circle portion labeled "5" of the laptop case assembly shown in FIG. 2.

FIG. 6 is an enlarged top plan view of the dashed-circle portion labeled "6" of the laptop case assembly shown in FIG. 2.

DETAILED DESCRIPTION

Figure 1:
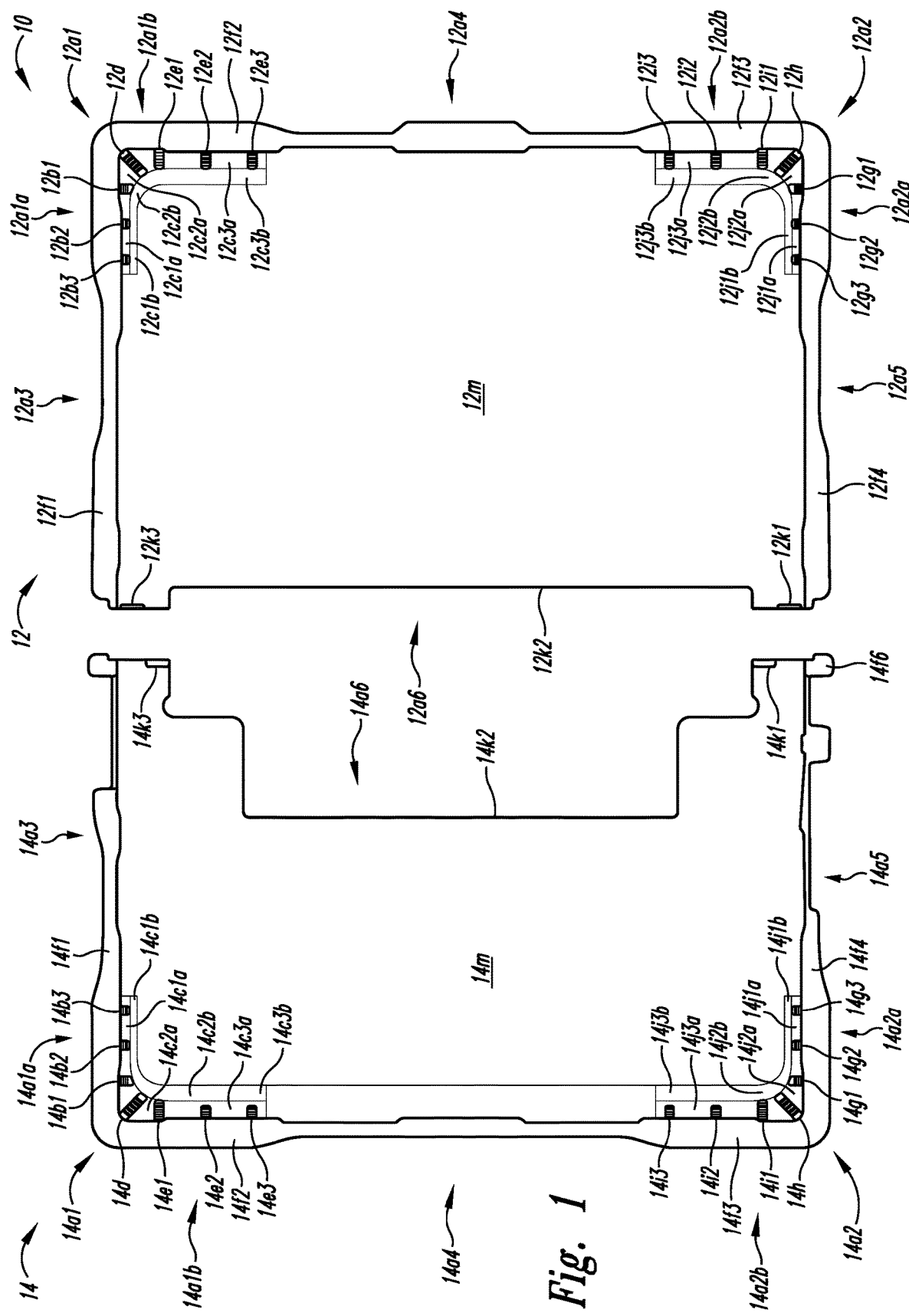
FIG. 1 is a top plan view of a laptop case assembly.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is a top perspective view of a laptop case assembly 10. The laptop case assembly 10 is shown to include display case portion 12 and keyboard case portion 14. The display case portion 12 and keyboard case portion 14 are shown spaced from one another to show that they are separate pieces.

The display case portion 12 is shown to include first corner area 12a1, second corner area 12a2, first side 12a3, second side 12a4, third side 12a5, fourth side 12a6, first shelf portion 12f1, second shelf portion 12f2, third shelf portion 12f3, fourth shelf portion 12f4, tab stop 12k1, edge portion 12k2, tab stop 12k3, base portion 12m. One or more portions of first shelf portion 12f1, second shelf portion 12f2, third shelf portion 12f3, and/or fourth shelf portion 12f4 can extend over one or more portions of base portion 12m. The tab stop 12k1 and tab stop 12k3 help to retain laptop display 112 (shown in FIGS. 11-13) a laptop that can be coupled with display case portion 12.

The keyboard case portion 14 is shown to include first corner area 14a1, second corner area 14a2, first side 14a3, second side 14a4, third side 14a5, fourth side 14a6, first shelf portion 14f1, second shelf portion 14f2, third shelf portion 14f3, fourth shelf portion 14f4, tab stop 14k1, edge portion 14k2, tab stop 14k3, base portion 14m. One or more portions of first shelf portion 14f1, second shelf portion 14f2, third shelf portion 14f3, and/or fourth shelf portion 14f4 can extend over one or more portions of base portion 14m. The tab stop 14k1 and tab stop 14k3 help to retain laptop keyboard 114 (shown in FIGS. 11-13) of a laptop (not shown) that can be coupled with keyboard case portion 14.

Figure 2:
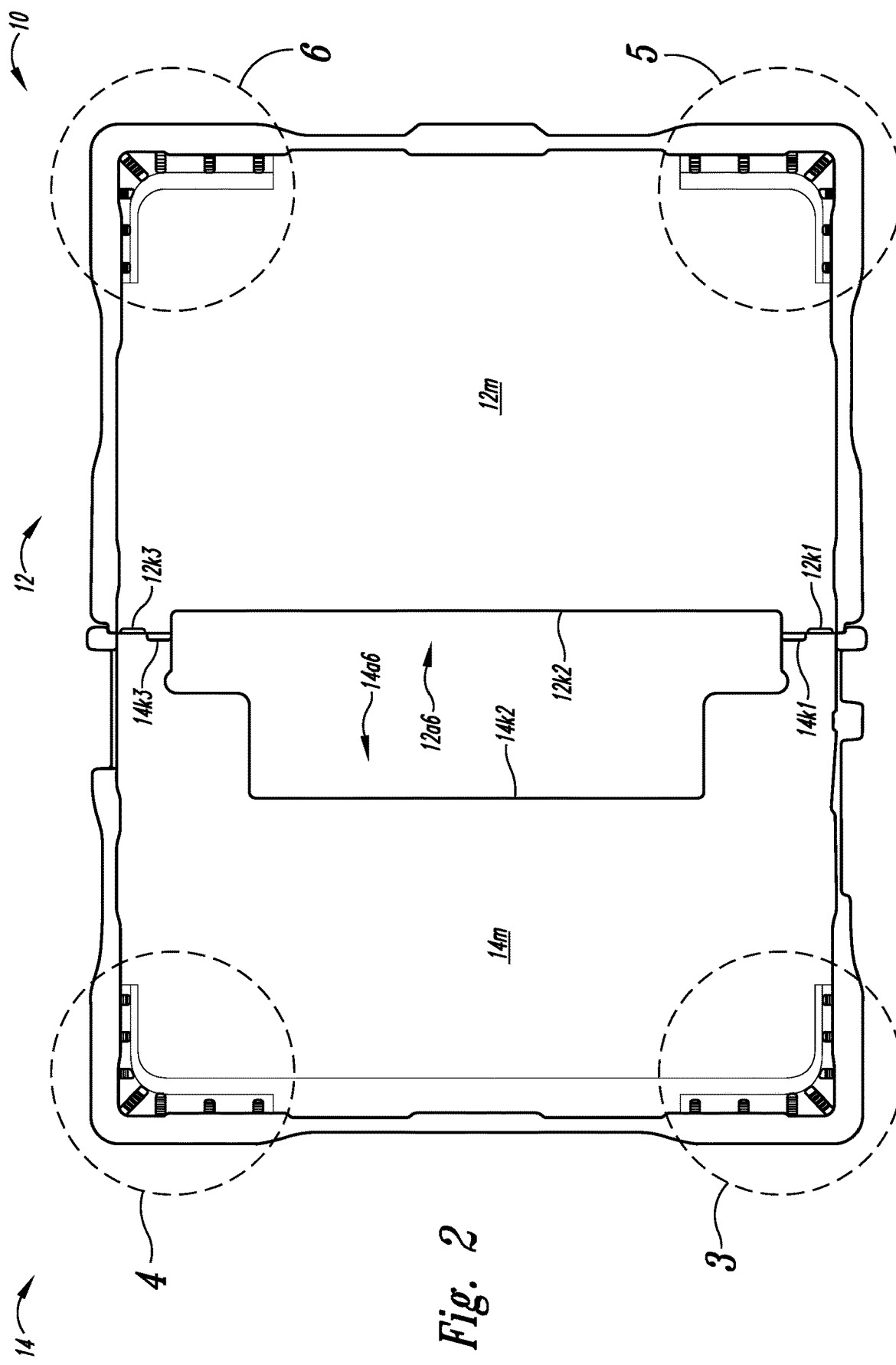
FIG. 2 is a top plan view of the laptop case assembly of FIG. 1.

Turning to FIG. 2, depicted therein is a top plan view of the laptop case assembly 10 of FIG. 1 with display case portion 12 and keyboard case portion 14 adjacent one another.

Turning to FIG. 3, depicted therein is an enlarged top plan view of the dashed-circle portion labeled "3" of the laptop case assembly 10 shown in FIG. 2. The second corner area 14a2 is shown to include side portion 14a2a, and side portion 14a2b. The side portion 14a2a is shown to include pad portion 14g1, pad portion 14g2, pad portion 14g3, angled portion 14j1a, and depressed portion 14j1b. The pad portion 14g1 is shown to include groove 14g1a and ridge 14g1b; pad portion 14g2 is shown to include groove 14g2a and ridge 14g2b; and pad portion 14g3 is shown to include groove 14g3a and ridge 14g3b.

The side portion 14a2b is shown to include pad portion 14i1, pad portion 14i2, pad portion 14i3, angled portion 14j3a, and depressed portion 14j3b. The pad portion 14i1 is shown to include groove 14i1a and ridge 14i1b; pad portion 14i2 is shown to include groove 14i2a and ridge 14i2b; and pad portion 14i3 is shown to include groove 14i3a and ridge 14i3b.

The second corner area 14a2 is further shown to include angled portion 14j2a, depressed portion 14j2b, and pad portion 14h. The pad portion 14h is shown to include groove 14h1 and ridge 14h2.

Turning to FIG. 4, depicted therein is an enlarged top plan view of the dashed-circle portion labeled "4" of the laptop case assembly shown in FIG. 2. The first corner area 14a1 is shown to include side portion 14a1a, and side portion 14a1b. The side portion 14a1a is shown to include pad portion 14b1, pad portion 14b2, pad portion 14b3, angled portion 14c1a, and depressed portion 14c1b. The pad portion 14b1 is shown to include groove 14b1a and ridge 14b1b; pad portion 14b2 is shown to include groove 14b2a and ridge 14b2b; and pad portion 14b3 is shown to include groove 14b3a and ridge 14b3b.

The side portion 14a1b is shown to include pad portion 14e1, pad portion 14e2, pad portion 14e3, angled portion 14c3a, and depressed portion 14c3b. The pad portion 14e1 is shown to include groove 14e1a and ridge 14e1b; pad portion 14e2 is shown to include groove 14e2a and ridge 14e2b; and pad portion 14e3 is shown to include groove 14e3a and ridge 14e3b.

The first corner area 14a1 is further shown to include angled portion 14c2a, depressed portion 14c2b, and pad portion 14d. The pad portion 14d is shown to include groove 14d1 and ridge 14d2.

Turning to FIG. 5, depicted therein is an enlarged top plan view of the dashed-circle portion labeled "5" of the laptop case assembly 10 shown in FIG. 2. The second corner area 12a2 is shown to include side portion 12a2a, and side portion 12a2b. The side portion 12a2a is shown to include pad portion 12g1, pad portion 12g2, pad portion 12g3, angled portion 12j1a, and depressed portion 12j1b. The pad portion 12g1 is shown to include groove 12g1a and ridge 12g1b; pad portion 12g2 is shown to include groove 12g2a and ridge 12g2b; and pad portion 12g3 is shown to include groove 12g3a and ridge 12g3b.

The side portion 12a2b is shown to include pad portion 12i1, pad portion 12i2, pad portion 12i3, angled portion 12j3a, and depressed portion 12j3b. The pad portion 12i1 is shown to include groove 12i1a and ridge 12i1b; pad portion 12i2 is shown to include groove 12i2a and ridge 12i2b; and pad portion 12i3 is shown to include groove 12i3a and ridge 12i3b.

The second corner area 12a2 is further shown to include angled portion 12j2a, depressed portion 12j2b, and pad portion 12h. The pad portion 12h is shown to include groove 12h1 and ridge 12h2.

Turning to FIG. 6, depicted therein is an enlarged top plan view of the dashed-circle portion labeled "6" of the laptop case assembly 10 shown in FIG. 2. The first corner area 12a1 is shown to include side portion 12a1a, and side portion 12a1b. The side portion 12a1a is shown to include pad portion 12b1, pad portion 12b2, pad portion 12b3, angled portion 12c1a, and depressed portion 12c1b. The pad portion 12b1 is shown to include groove 12b1a and ridge 12b1b; pad portion 12b2 is shown to include groove 12b2a and ridge 12b2b; and pad portion 12b3 is shown to include groove 12b3a and ridge 12b3b.

The side portion 12a1b is shown to include pad portion 12e1, pad portion 12e2, pad portion 12e3, angled portion 12c3a, and depressed portion 12c3b. The pad portion 12e1 is shown to include groove 12e1a and ridge 12e1b; pad portion 12e2 is shown to include groove 12e2a and ridge 12e2b; and pad portion 12e3 is shown to include groove 12e3a and ridge 12e3b.

The first corner area 12a1 is further shown to include angled portion 12c2a, depressed portion 12c2b, and pad portion 12d. The pad portion 12d is shown to include groove 12d1 and ridge 12d2.

Figure 7:
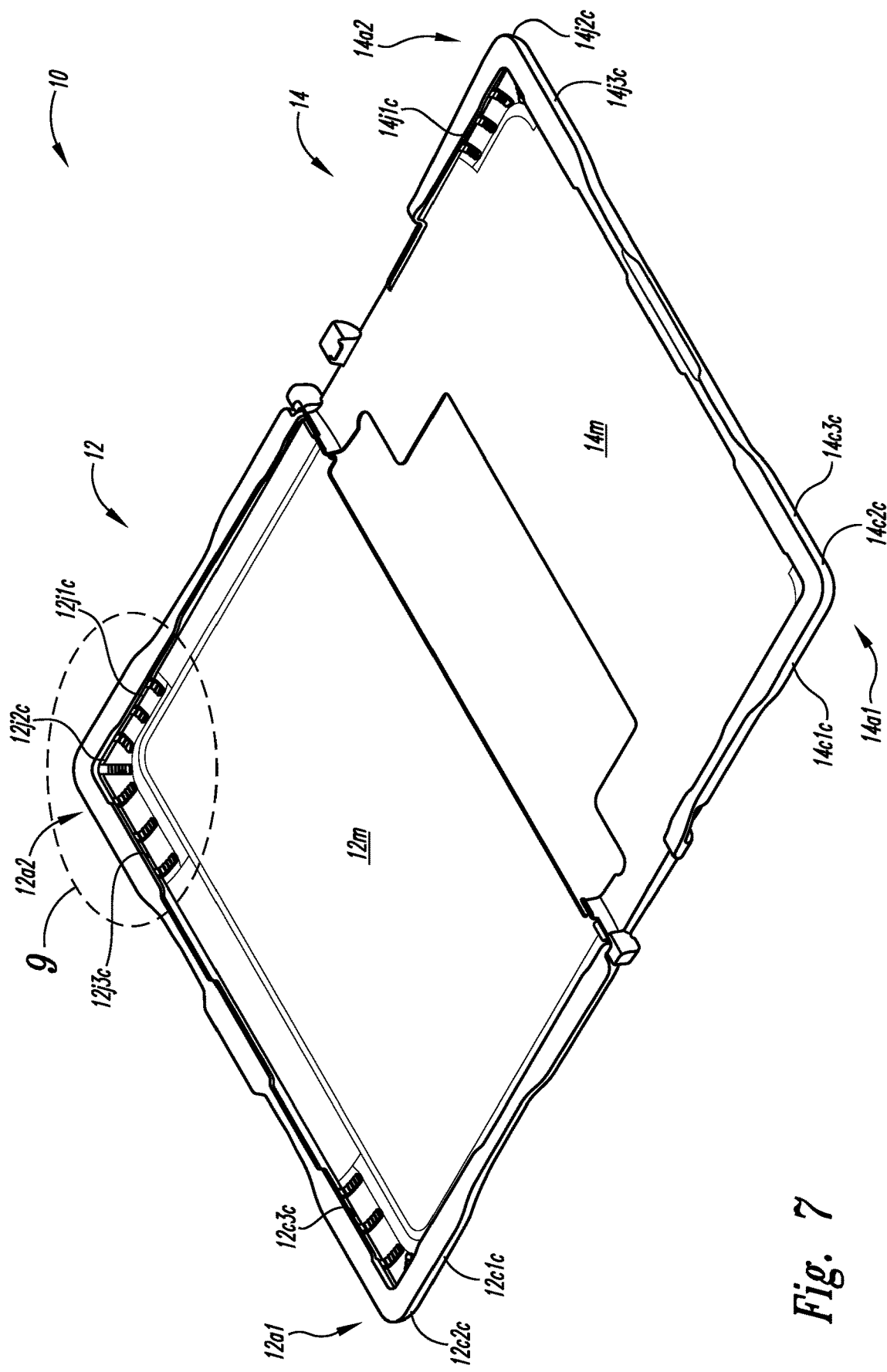
FIG. 7 is a top perspective view of the laptop case assembly shown in FIG. 1.

Turning to FIG. 7, depicted therein is a top perspective view of the laptop case assembly 10 shown in FIG. 1. The first corner area 12a1 is further shown to include wall portion 12c1c, wall portion 12c2c, and wall portion 12c3c. The second corner area 12a2 is further shown to include wall portion 12j1c, wall portion 12j2c, and wall portion 12j3c. The first corner area 14a1 is further shown to include wall portion 14c1c, wall portion 14c2c, and wall portion 14c3c. The second corner area 14a2 is further shown to include wall portion 14j1c, wall portion 14j2c, and wall portion 14j3c.

Figure 8:
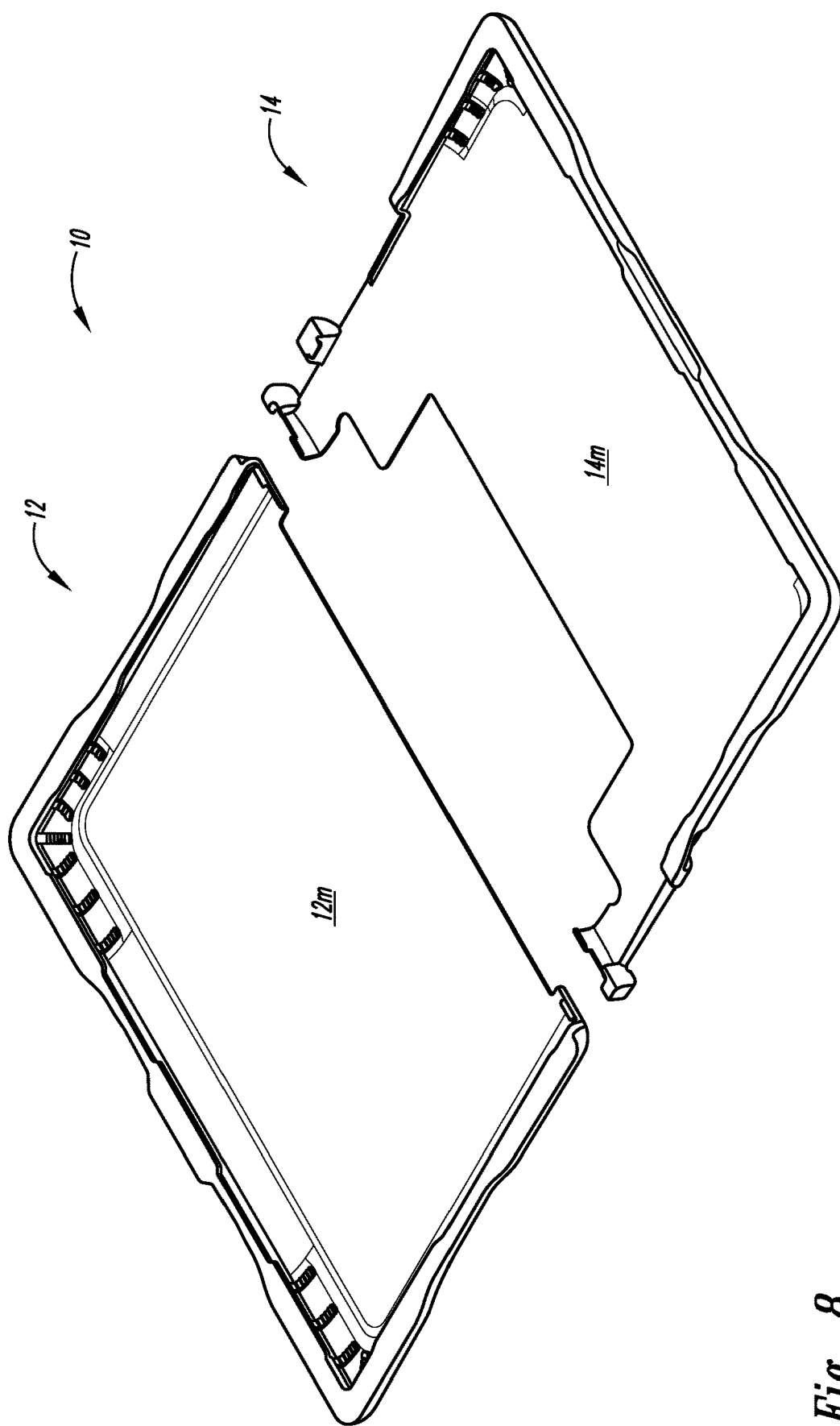
FIG. 8 is a top perspective view of the laptop case assembly shown in FIG. 1.

Turning to FIG. 8, depicted therein is a top perspective view of the laptop case assembly 10 shown in FIG. 1 wherein display case portion 12 and keyboard case portion 14 are shown separated from one another.

Figure 9:
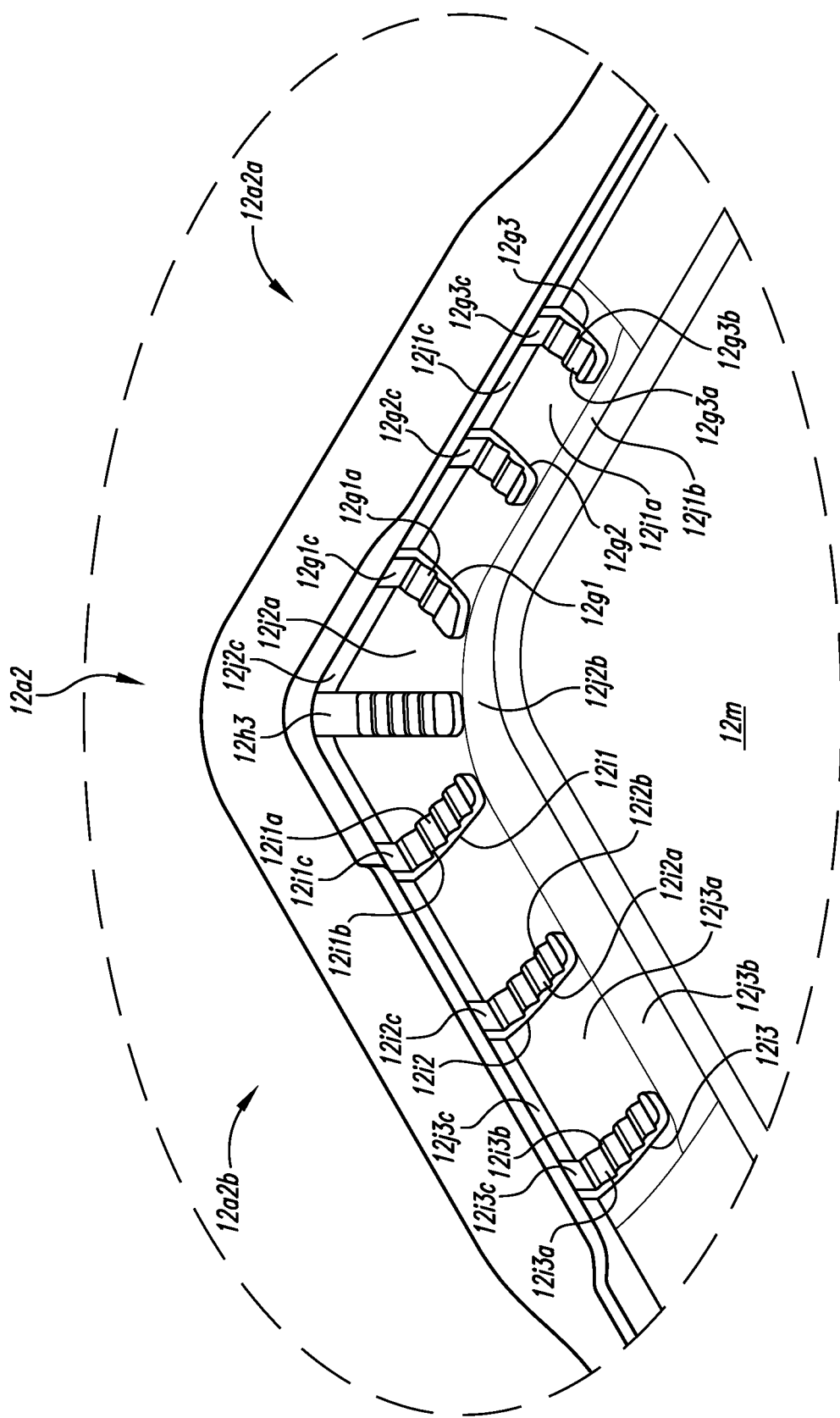
FIG. 9 is an enlarged top perspective view of the dashed-circle portion labeled "9" of the laptop case assembly shown in FIG. 7.

Turning to FIG. 9, depicted is an enlarged top perspective view of the dashed-circle portion labeled "9" of the laptop case assembly 10 shown in FIG. 7. The second corner area 12a2 is further shown to include wall portion 12j1c, wall portion 12j2c, and wall portion 12j3c.

The second corner area 12a2 is further shown to include pad portion 12g1 having wall portion 12g1c shown being adjacent to wall portion 12j1c and other portions of pad portion 12g1 shown being adjacent to angled portion 12j1a, pad portion 12g2 having wall portion 12g2c shown being adjacent to wall portion 12j1c and other portions of pad portion 12g2 shown being adjacent to angled portion 12j1a, and pad portion 12g3 having wall portion 12g3c shown being adjacent to wall portion 12j1c and other portions of pad portion 12g3 shown being adjacent to angled portion 12j1a. The second corner area 12a2 is further shown to include pad portion 12h having wall portion 12i1c shown being adjacent to wall portion 12j3c and other portions of pad portion 12h shown being adjacent to angled portion 12j2a.

The second corner area 12a2 is further shown to include pad portion 12i1 having wall portion 12i1c shown being adjacent to wall portion 12j3c and other portions of pad portion 12i1 shown being adjacent to angled portion 12j3a, pad portion 12i2 having wall portion 12i2c shown being adjacent to wall portion 12j3c and other portions of pad portion 12i2 shown being adjacent to angled portion 12j3a, and pad portion 12i3 having wall portion 12i3c shown being adjacent to wall portion 12j3c and other portions of pad portion 12i3 shown being adjacent to angled portion 12j3a.

Figure 10:
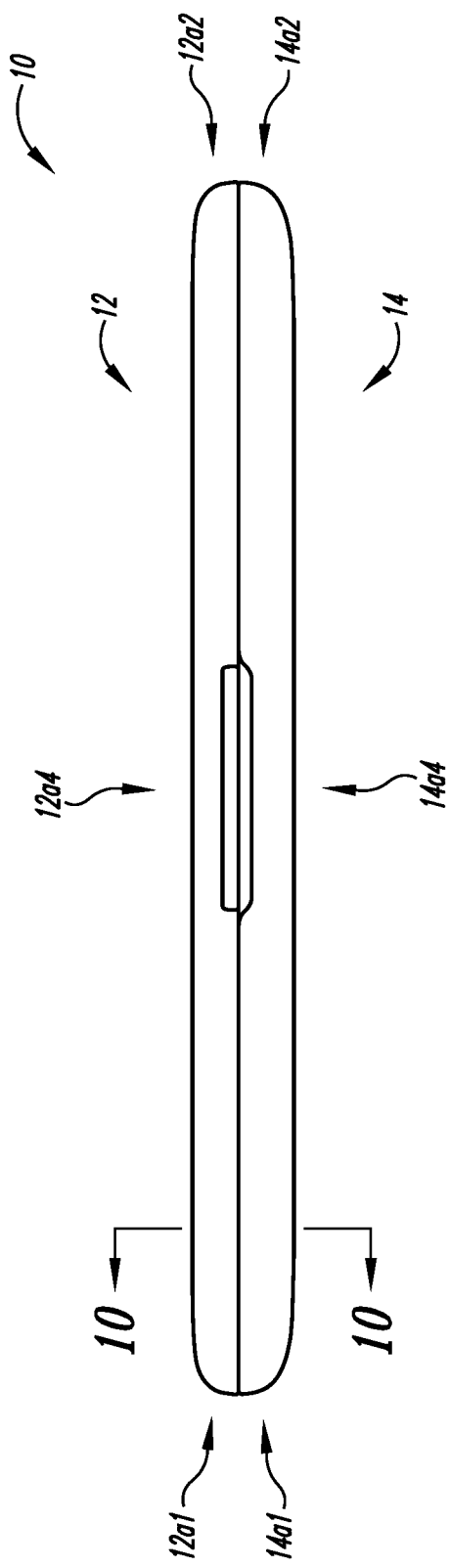
FIG. 10 is a side-elevational view of the laptop case assembly shown in FIG. 1.

Turning to FIG. 10, depicted therein is a side-elevational view of the laptop case assembly 10 shown in FIG. 1.

Figure 11:
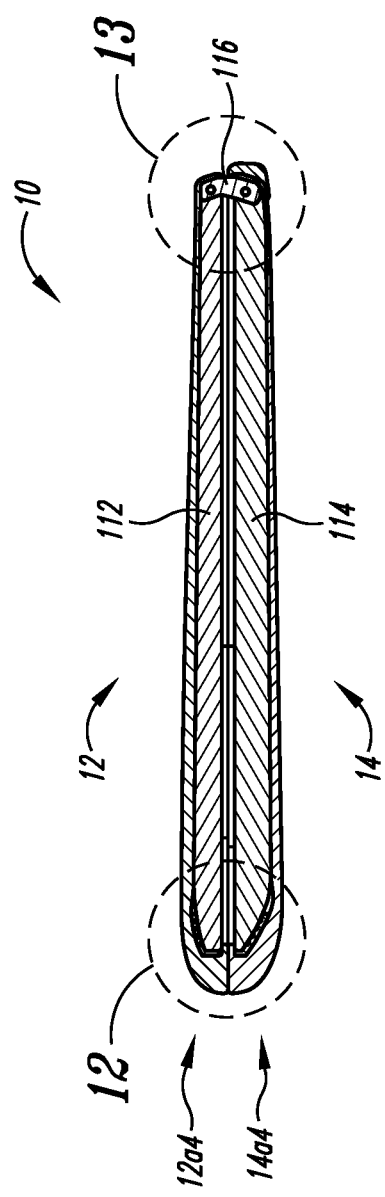
FIG. 11 is a cross-sectional side-elevational view of the laptop case assembly taken along the 11-11 cut line of FIG. 10.

Turning to FIG. 11, depicted therein is a cross-sectional side-elevational view of the laptop case assembly 10 taken along the 11-11 cut line of FIG. 10. The display case portion 12 is shown to contain laptop display 112. The keyboard case portion 14 is shown to contain laptop keyboard 114. The laptop display 112 and laptop keyboard 114 are shown to be coupled together by hinge 116.

Figure 12:
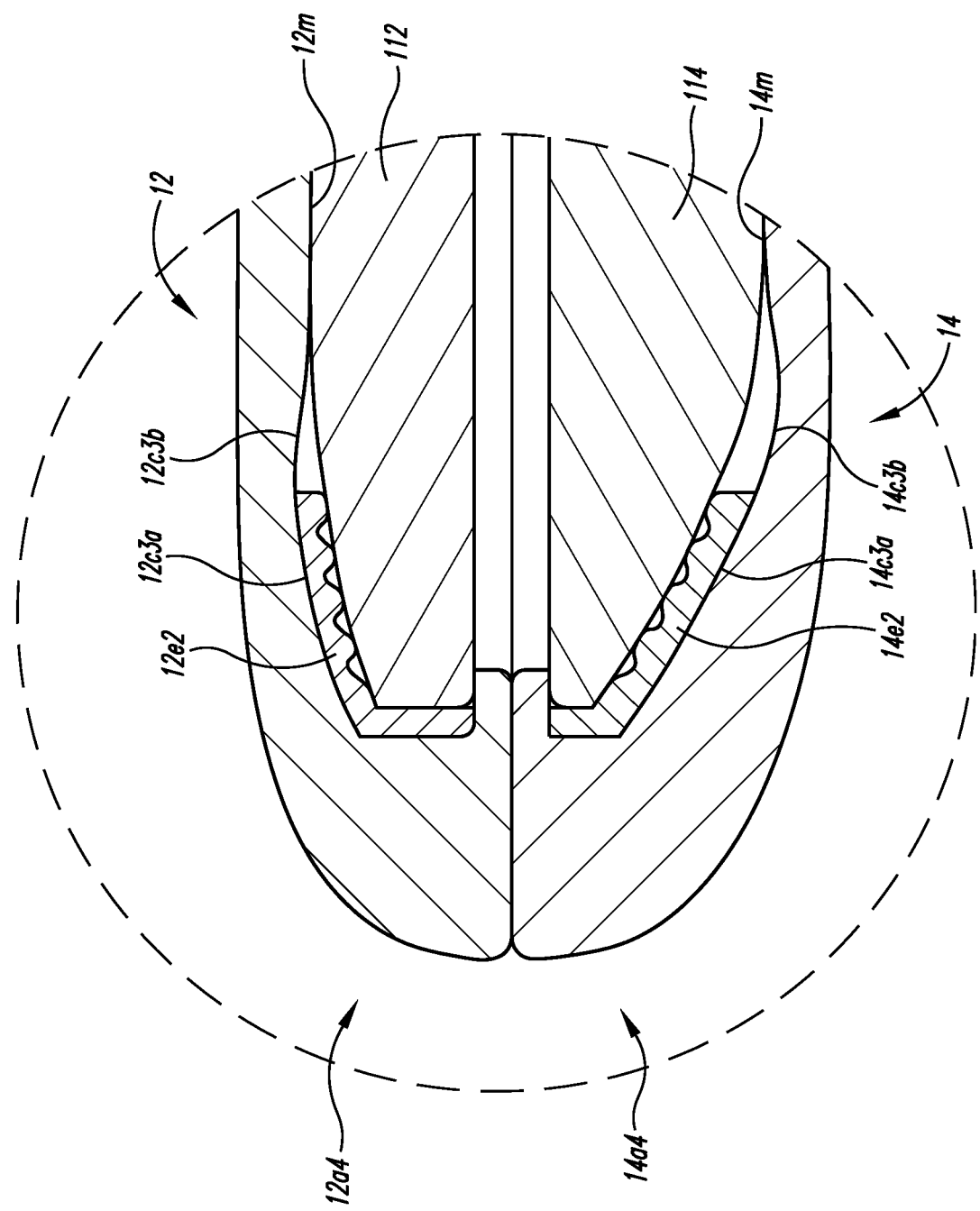
FIG. 12 is an enlarged cross-sectional side-elevational view of the dashed-circle portion labeled "12" of the laptop case assembly shown in FIG. 11.

Turning to FIG. 12, depicted therein is an enlarged cross-sectional side-elevational view of the dashed-circle portion labeled "12" of the laptop case assembly 10 shown in FIG. 11 wherein depressed portion 12c3b shown to be spaced away from laptop display 112 whereas base portion 12m and pad portion 12e2 are shown touching laptop display 112 and wherein depressed portion 12c3b shown to be spaced away from laptop display 112 whereas base portion 14m and pad portion 14e2 are shown touching laptop keyboard 114.

Figure 13:
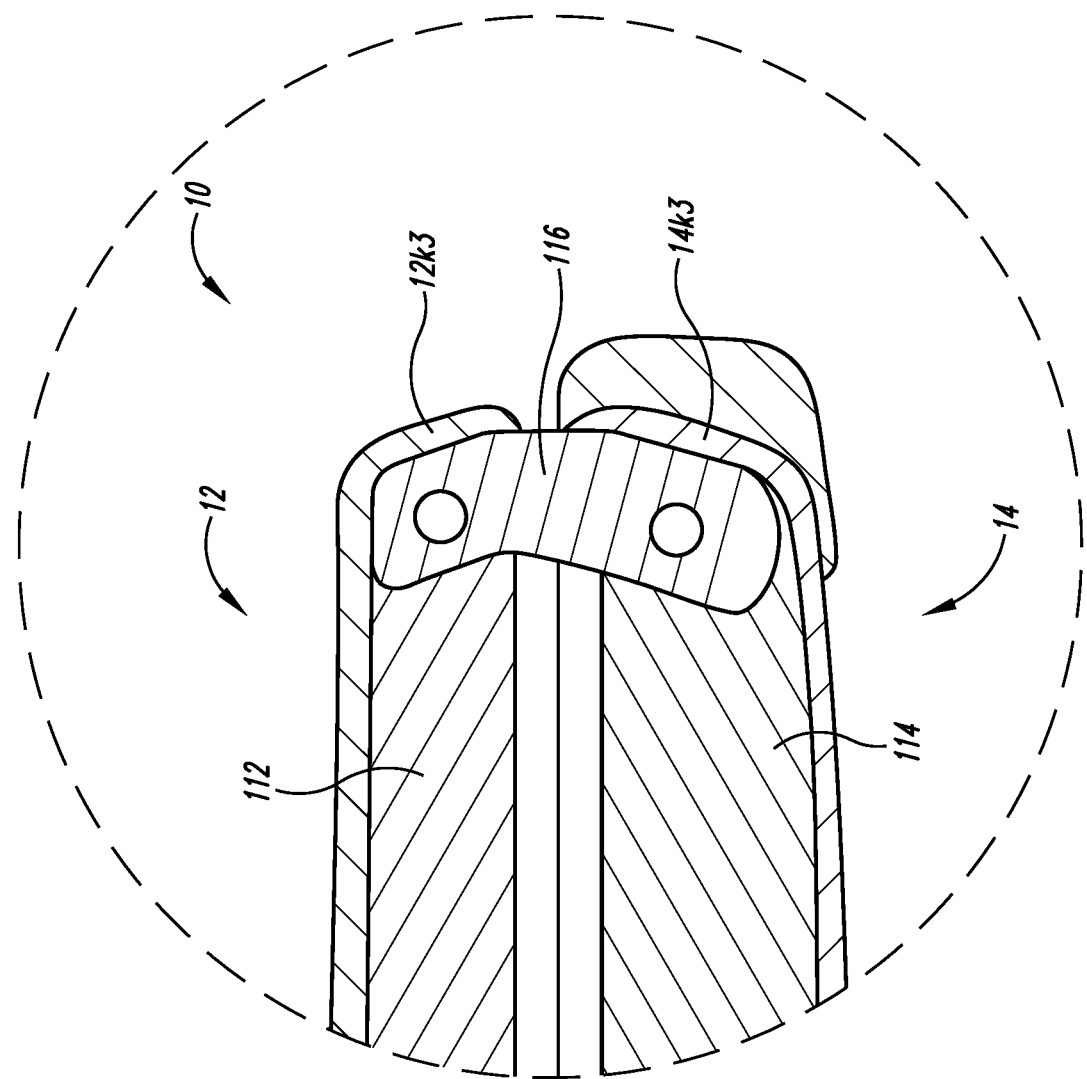
FIG. 13 is an enlarged cross-sectional side-elevational view of the dashed-circle portion labeled "13" of the laptop case assembly shown in FIG. 11.

Turning to FIG. 13, depicted therein is an enlarged cross-sectional side-elevational view of the dashed-circle portion labeled "13" of the laptop case assembly 10 shown in FIG. 11.

Figure 14:
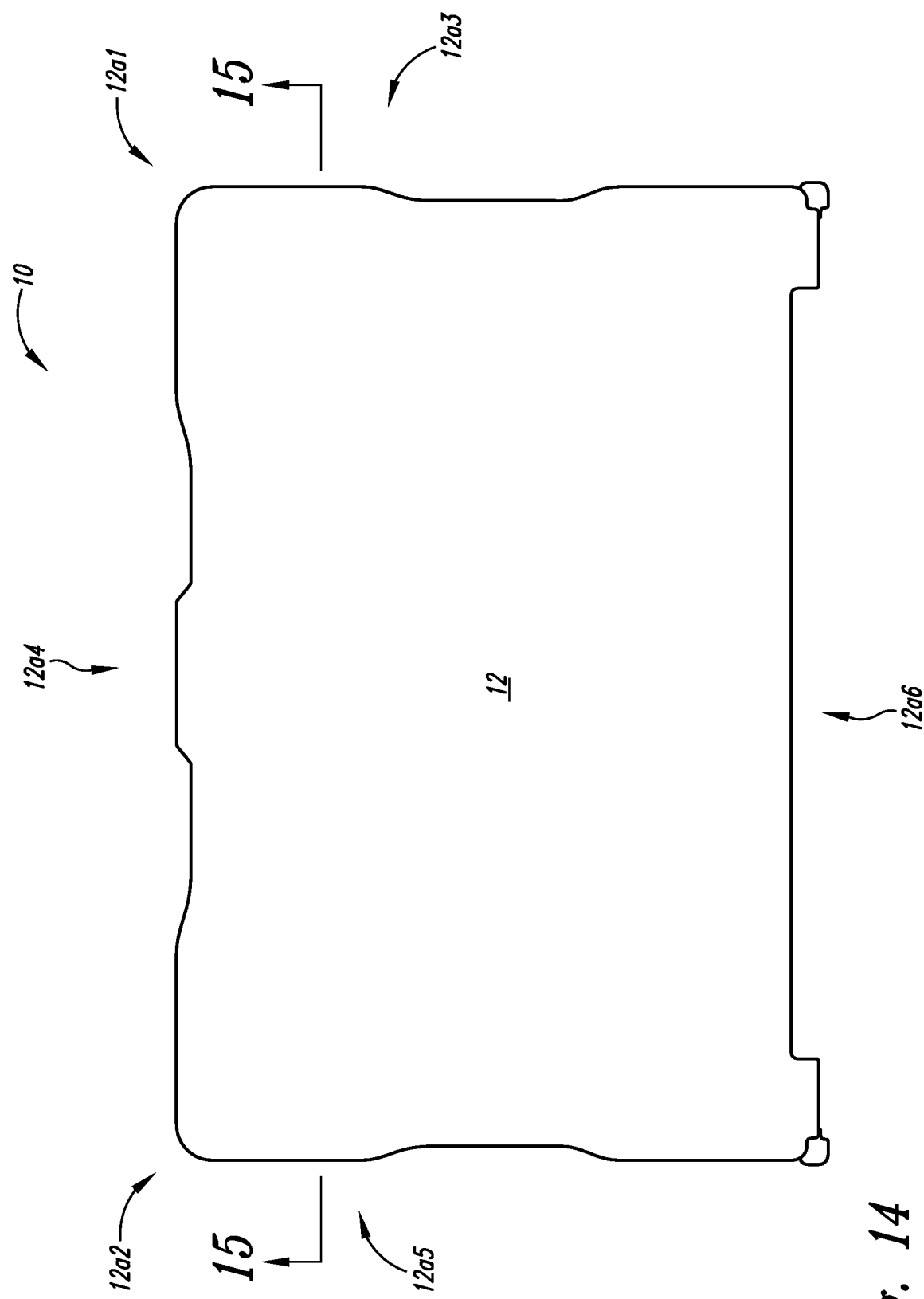
FIG. 14 is a top plan view of a display case portion of the laptop case assembly shown in FIG. 1.

Turning to FIG. 14, depicted therein is a top plan view of a display case portion of the laptop case assembly 10 shown in FIG. 1.

Figure 15:
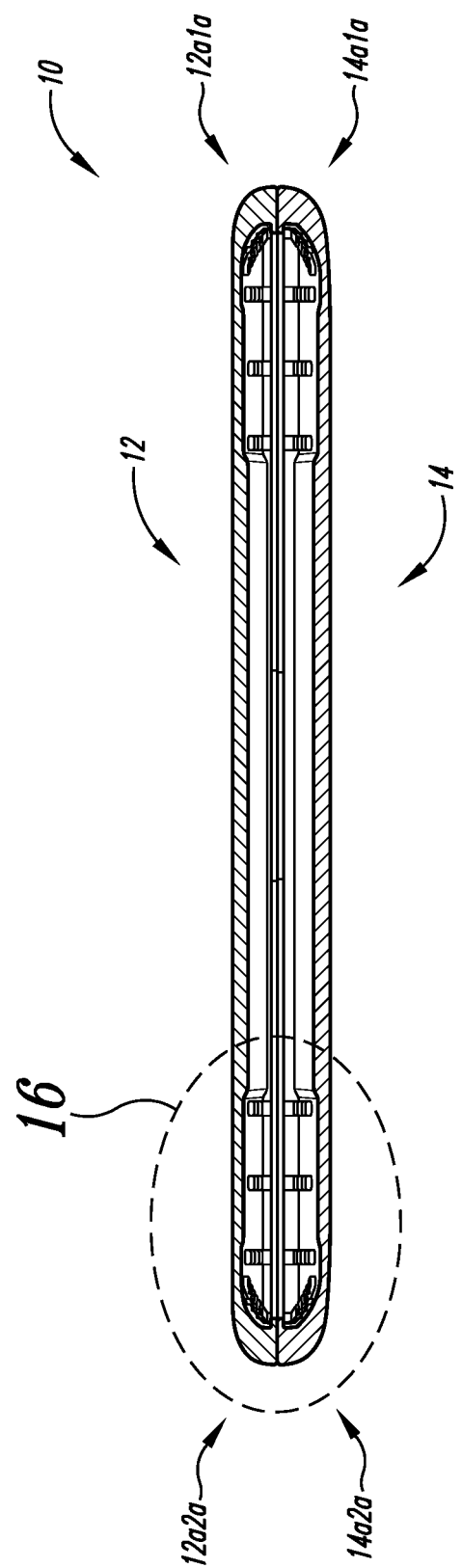
FIG. 15 is a cross-sectional side-elevational view of the laptop case assembly taken along the 15-15 cut line of FIG. 14.

Turning to FIG. 15, depicted therein is a cross-sectional side-elevational view of the laptop case assembly 10 taken along the 15-15 cut line of FIG. 14.

Figure 16:
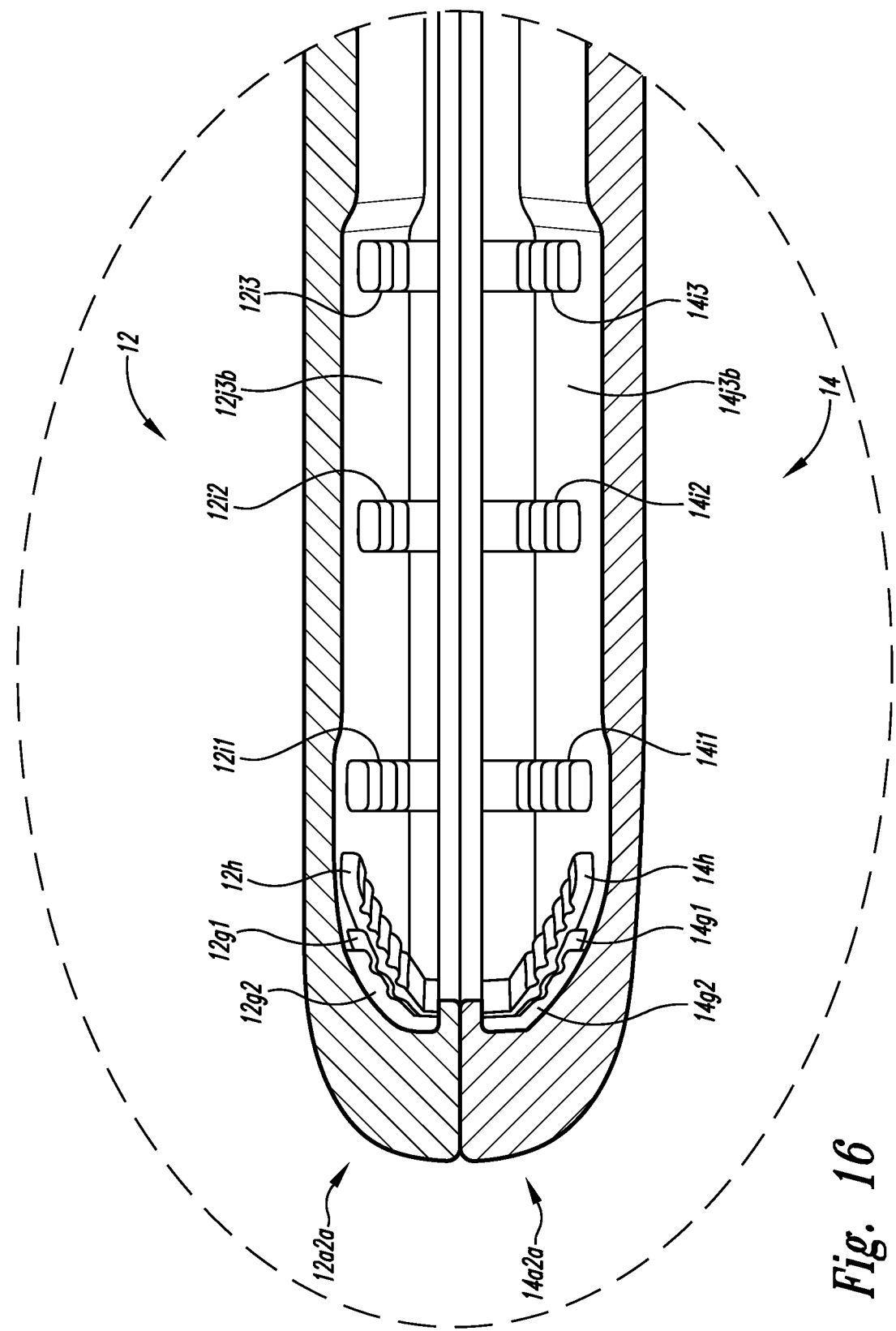
FIG. 16 is an enlarged cross-sectional side-elevational view of the dashed-circle portion labeled "16" of the laptop case assembly shown in FIG. 15.

Turning to FIG. 16, depicted therein is an enlarged cross-sectional side-elevational view of the dashed-circle portion labeled "16" of the laptop case assembly 10 shown in FIG. 15.

As shown by one or more of FIGS. 1-16, implementations of laptop case assembly 10 for a laptop, the laptop including a laptop display 112 and a laptop keyboard 114, the laptop case assembly 10 can include (I) a display case portion 12 can include a first side 12a3, a second side 12a4, a third side 12a5, a fourth side 12a6, a base portion 12m, and at least one pad portion 12b1, (A) the base portion 12m can include at least one surface portion, (B) the base portion 12m being circumferentially bound by the first side 12a3, the second side 12a4, the third side 12a5, and the fourth side 12a6, (C) the at least one pad portion 12b1 being contiguously adjacent to the at least one surface portion of the base portion 12m, (D) the at least one pad portion 12b1 can include a plurality of ridges 12b1a and a plurality grooves 12b1b, (i) at least one of the plurality of ridges 12b1a being contiguously adjacent to at least one of the plurality of grooves 12b1b; and (II) a keyboard case portion 14 can include a first side 14a3, a second side 14a4, a third side 14a5, a fourth side 14a6, a base portion 14m, and at least one pad portion 14b1, (A) the base portion 14m can include at least one surface portion, (B) the base portion 14m being circumferentially bound by the first side 14a3, the second side 14a4, the third side 14a5, and the fourth side 14a6, (C) the at least one pad portion 14b1 can be contiguously adjacent to the at least one surface portion of the base portion 14m, (D) the at least one pad portion 14b1 can include a plurality of ridges 14b1a and a plurality grooves 14b1b, (i) at least one of the plurality of ridges 14b1a can be contiguously adjacent to at least one of the plurality of grooves 14b1b.

Implementations can include the at least one pad portion 12b1 of the display case portion 12 being proximate to the first side 12a3 of the at least one display case portion 12, and can include the at least one pad portion 14b1 of the keyboard case portion 14 being proximate to the first side 14a3 of the at least one keyboard case portion 14.

Implementations can include a first plurality of the at least one pad portion 12b1 of the display case portion 12 being proximate to the first side 12a3 of the at least one display case portion 12, can include a second plurality of the at least one pad portion 12e1 of the display case portion 12 being proximate to the second side 12a4 of the at least one display case portion 12, can include a first plurality of the at least one pad portion 14b1 of the keyboard case portion 14 being proximate to the first side 14a3 of the at least one keyboard case portion 14, and can include a second plurality of the at least one pad portion 14e1 of the display case portion 12 being proximate to the second side 12a4 of the at least one display case portion 12.

Implementations can include the first side 12a3 and the second side 12a4 of the display case portion 12 demarcating a first corner area 12a1, at least one of the at least one pad portion 12d positioned in the first corner area 12a1 of the display case portion 12, and can include the first side 14a3 and the second side 14a4 of the at least one keyboard case portion 14 demarcating a first corner area 14a1, at least one of the at least one pad portion 14d positioned in the first corner area 14a1 of the keyboard case portion 14.

Implementations can include the base portion 12m of the display case portion 12 including at least one depressed portion 12c1b proximate to the at least one pad portion 12b1 and the base portion 14m of the keyboard case portion 14 including at least one depressed portion 14c1b proximate to the at least one pad portion 14b1.

Implementations can include the base portion 12m of the display case portion 12 including at least one angled portion 12c1a, the at least one pad portion 12b1 being contiguously adjacent to at least one surface portion of the at least one angled portion 12c1a, and the base portion 14m of the keyboard case portion 14 including at least one angled portion 14c1a, the at least one pad portion 14b1 being contiguously adjacent to at least one surface portion of the at least one angled portion 14c1a.

Implementations can include the at least one pad portion 12b1 of the display case portion 12 including an elongated longitudinal dimension extending perpendicularly from the first side 12a3 of the at least one display case portion 12, and wherein the at least one pad portion 14b1 of the keyboard case portion 14 including an elongated longitudinal dimension extending perpendicularly from the first side 14a3 of the at least one keyboard case portion 14.

Implementations can include the at least one pad portion 12b1 of the display case portion 12 including a silicone material and can include the at least one pad portion 14b1 of the display case portion 12 including a silicone material.

Implementations can include the at least one pad portion 12b1 of the display case portion 12 including a polyurethane material and can include the at least one pad portion 14b1 of the keyboard case portion 14 including a polyurethane material.

Implementations can include the at least one pad portion 12b1 of the display case portion 12 including an elastomeric material and can include the at least one pad portion 12b1 of the display case portion 12 including an elastomeric material.

Implementations can include the base portion 12m and the at least one pad portion 12b1 of the display case portion 12 being co-molded together and can include the base portion 14m and the at least one pad portion 14b1 of the keyboard case portion 14 being co-molded together.

Implementations can include the base portion 12m and the at least one pad portion 12b1 of the display case portion 12 being adhesively affixed together and can include the base portion 14m and the at least one pad portion 14b1 of the keyboard case portion 14 are adhesively affixed together.

Implementations can include the first side 12a3 of the at least one display case portion 12 including a wall portion 12c1c, a portion of the at least one pad portion 12b1 of the display case portion 12 being contiguously adjacent to the wall portion 12c1c of the first side 12a3 of the at least one display case portion 12, and can include the first side 14a3 of the at least one keyboard case portion 14 including a wall portion 14c1c, a portion of the at least one pad portion 14b1 of the keyboard case portion 14 being contiguously adjacent to the wall portion 14c1c of the first side 14a3 of the at least one keyboard case portion 14.

Implementations can include the first side 12a3 of the at least one display case portion 12 including a first shelf portion 12f1 extending over the base portion 12m of the display case portion 12, and can include the first side 14a3 of the at least one keyboard case portion 14 including a first shelf portion 14f1 extending over the base portion 14m of the keyboard case portion 14.

Implementations can include the fourth side 12a6 of the at least one display case portion 12 including at least one tab stop 12k1, and can include the fourth side 14a6 of the at least one keyboard case portion 14 including at least one tab stop 14k1.

As shown by one or more of FIGS. 1-16, implementations of a laptop case assembly 10 for a laptop, the laptop including a laptop display 112 and a laptop keyboard 114, the laptop case assembly 10 can include (I) a display case portion 12 including a first side 12a3, a second side 12a4, a third side 12a5, a fourth side 12a6, a base portion 12m, and at least one pad portion 12b1, (A) the base portion 12m including at least one surface portion, (B) the base portion 12m being circumferentially bound by the first side 12a3, the second side 12a4, the third side 12a5, and the fourth side 12a6, (C) the at least one pad portion 12b1 being contiguously adjacent to the at least one surface portion of the base portion 12m, (D) the at least one pad portion 12b1 including a plurality of ridges 12b1a and a plurality grooves 12b1b, (i) at least one of the plurality of ridges 12b1a being contiguously adjacent to at least one of the plurality of grooves 12b1b.

Implementations can include the at least one pad portion 12b1 of the display case portion 12 being proximate to the first side 12a3 of the at least one display case portion 12, and can include the at least one pad portion 14b1 of the keyboard case portion 14 being proximate to the first side 14a3 of the at least one keyboard case portion 14.

Implementations can include a first plurality of the at least one pad portion 12b1 of the display case portion 12 being proximate to the first side 12a3 of the at least one display case portion 12, can include a second plurality of the at least one pad portion 12e1 of the display case portion 12 being proximate to the second side 12a4 of the at least one display case portion 12, can include a first plurality of the at least one pad portion 14b1 of the keyboard case portion 14 being proximate to the first side 14a3 of the at least one keyboard case portion 14, and can include a second plurality of the at least one pad portion 14e1 of the display case portion 12 being proximate to the second side 12a4 of the at least one display case portion 12.

As shown by one or more of FIGS. 1-16, implementations of a laptop case assembly 10 for a laptop, the laptop including a laptop display 112 and a laptop keyboard 114, the laptop case assembly 10 can include (I) a keyboard case portion 14 including a first side 14a3, a second side 14a4, a third side 14a5, a fourth side 14a6, a base portion 14m, and at least one pad portion 14b1, (A) the base portion 14m including at least one surface portion, (B) the base portion 14m being circumferentially bound by the first side 14a3, the second side 14a4, the third side 14a5, and the fourth side 14a6, (C) the at least one pad portion 14b1 being contiguously adjacent to the at least one surface portion of the base portion 14m, (D) the at least one pad portion 14b1 including a plurality of ridges 14b1a and a plurality grooves 14b1b, (i) at least one of the plurality of ridges 14b1a being contiguously adjacent to at least one of the plurality of grooves 14b1b.

Implementations can include the display case portion 12 demarcating a first corner area 12a1, at least one of the at least one pad portion 12d positioned in the first corner area 12a1 of the display case portion 12, and can include the first side 14a3 and the second side 14a4 of the at least one keyboard case portion 14 demarcating a first corner area 14a1, at least one of the at least one pad portion 14d positioned in the first corner area 14a1 of the keyboard case portion 14.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A laptop case assembly for a laptop, the laptop including a laptop display and a laptop keyboard, the laptop case assembly comprising:
   (I) a display case portion including a first side, a second side, a third side, a fourth side, a base portion, and at least one pad portion,
      (A) the base portion including at least one surface portion,
      (B) the base portion being circumferentially bound by the first side, the second side, the third side, and the fourth side,
      (C) the at least one pad portion being contiguously adjacent to the at least one surface portion of the base portion,
      (D) the at least one pad portion including a plurality of ridges and a plurality of grooves,
         (i) at least one of the plurality of ridges being contiguously adjacent to at least one of the plurality of grooves; and
   (II) a keyboard case portion including a first side, a second side, a third side, a fourth side, a base portion, and at least one pad portion,
      (A) the base portion including at least one surface portion,
      (B) the base portion being circumferentially bound by the first side, the second side, the third side, and the fourth side,
      (C) the at least one pad portion being contiguously adjacent to the at least one surface portion of the base portion,
      (D) the at least one pad portion including a plurality of ridges and a plurality of grooves,
         (i) at least one of the plurality of ridges being contiguously adjacent to at least one of the plurality of grooves,
   wherein the base portion of the display case portion includes at least one depressed portion proximate to the at least one pad portion and the base portion of the keyboard case portion includes at least one depressed portion proximate to the at least one pad portion.

2. The laptop case assembly of claim 1, wherein the at least one pad portion of the display case portion being proximate to the first side of the at least one display case portion, and wherein the at least one pad portion of the keyboard case portion being proximate to the first side of the at least one keyboard case portion.

3. The laptop case assembly of claim 1, wherein a first plurality of the at least one pad portion of the display case portion being proximate to the first side of the at least one display case portion, a second plurality of the at least one pad portion of the display case portion being proximate to the second side of the at least one display case portion, and wherein a first plurality of the at least one pad portion of the keyboard case portion being proximate to the first side of the at least one keyboard case portion, a second plurality of the at least one pad portion of the display case portion being proximate to the second side of the at least one display case portion.

4. The laptop case assembly of claim 1, wherein the first side and the second side of the display case portion demarcate a first corner area, at least one of the at least one pad portion positioned in the first corner area of the display case portion, and wherein the first side and the second side of the at least one keyboard case portion demarcate a first corner area, at least one of the at least one pad portion positioned in the first corner area of the keyboard case portion.

5. The laptop case assembly of claim 1, wherein the base portion of the display case portion includes at least one angled portion, the at least one pad portion being contiguously adjacent to at least one surface portion of the at least one angled portion, and the base portion of the keyboard case portion includes at least one angled portion, the at least one pad portion being contiguously adjacent to at least one surface portion of the at least one angled portion.

6. The laptop case assembly of claim 1, wherein the at least one pad portion of the display case portion including an elongated longitudinal dimension extending perpendicularly from the first side of the at least one display case portion, and wherein the at least one pad portion of the keyboard case portion including an elongated longitudinal dimension extending perpendicularly from the first side of the at least one keyboard case portion.

7. The laptop case assembly of claim 1, wherein the at least one pad portion of the display case portion comprises a silicone material and wherein the at least one pad portion of the display case portion comprises a silicone material.

8. The laptop case assembly of claim 1, wherein the at least one pad portion of the display case portion comprises a polyurethane material and wherein the at least one pad portion of the keyboard case portion comprises a polyurethane material.

9. The laptop case assembly of claim 1, wherein the at least one pad portion of the display case portion comprises an elastomeric material and wherein the at least one pad portion of the display case portion comprises an elastomeric material.

10. The laptop case assembly of claim 1, wherein the base portion and the at least one pad portion of the display case portion are co-molded together and the base portion and the at least one pad portion of the keyboard case portion are co-molded together.

11. The laptop case assembly of claim 1, wherein the base portion and the at least one pad portion of the display case portion are adhesively affixed together and the base portion and the at least one pad portion of the keyboard case portion are adhesively affixed together.

12. The laptop case assembly of claim 1, wherein the first side of the at least one display case portion includes a wall portion, a portion of the at least one pad portion of the display case portion being contiguously adjacent to the wall portion of the first side of the at least one display case portion, and wherein the first side of the at least one keyboard case portion includes a wall portion, a portion of the at least one pad portion of the keyboard case portion being contiguously adjacent to the wall portion of the first side of the at least one keyboard case portion.

13. The laptop case assembly of claim 1, wherein the first side of the at least one display case portion includes a first shelf portion extending over the base portion of the display case portion, and wherein the first side of the at least one keyboard case portion includes a first shelf portion extending over the base portion of the keyboard case portion.

14. The laptop case assembly of claim 1, wherein the fourth side of the at least one display case portion includes at least one tab stop, and wherein the fourth side of the at least one keyboard case portion includes at least one tab stop.

15. A case assembly for a portable electronic computing device, the portable electronic computing device including a display, the case assembly comprising: (I) a display case portion including a first side, a second side, a third side, a fourth side, a base portion, and at least one pad portion, (A) the base portion including at least one surface portion, (B) the base portion being circumferentially bound by the first side, the second side, the third side, and the fourth side, (C) the at least one pad portion being contiguously adjacent to the at least one surface portion of the base portion, (D) the at least one pad portion including a plurality of ridges and a plurality of grooves, (i) at least one of the plurality of ridges being contiguously adjacent to at least one of the plurality of grooves, wherein the base portion of the display case portion includes at least one depressed portion proximate to the at least one pad portion.

16. The case assembly of claim 15, wherein the at least one pad portion of the display case portion being proximate to the first side of the at least one display case portion.

17. The case assembly of claim 15, wherein a first plurality of the at least one pad portion of the display case portion being proximate to the first side of the at least one display case portion, and a second plurality of the at least one pad portion of the display case portion being proximate to the second side of the at least one display case portion.

18. A case assembly for a portable electronic computing device, the portable electronic computing device including a keyboard, the case assembly comprising: (I) a keyboard case portion including a first side, a second side, a third side, a fourth side, a base portion, and at least one pad portion, (A) the base portion including at least one surface portion, (B) the base portion being circumferentially bound by the first side, the second side, the third side, and the fourth side, (C) the at least one pad portion being contiguously adjacent to the at least one surface portion of the base portion, (D) the at least one pad portion including a plurality of ridges and a plurality of grooves, (i) at least one of the plurality of ridges being contiguously adjacent to at least one of the plurality of grooves, wherein the base portion of the keyboard case portion includes at least one depressed portion proximate to the at least one pad portion.

19. The case assembly of claim 18, wherein the first side and the second side of the at least one keyboard case portion demarcate a first corner area, at least one of the at least one pad portion positioned in the first corner area of the keyboard case portion.

* * * * *